United States Patent
Hsiung et al.

(10) Patent No.: US 7,479,709 B2
(45) Date of Patent: Jan. 20, 2009

(54) WIND-TUNNEL TYPE POWER GENERATOR

(75) Inventors: Tao-Pang Hsiung, Ping Tung (TW);
Jia-Wei Jan, Chang Hua Hsien (TW);
Tzeng-Wuu Wey, Hsin Chu Hsien (TW)

(73) Assignee: Industrial Technology Research Institute, Hsin Chu County (TW)

( * ) Notice: Subject to any disclaimer, the term of this patent is extended or adjusted under 35 U.S.C. 154(b) by 252 days.

(21) Appl. No.: 11/484,737

(22) Filed: Jul. 12, 2006

(65) Prior Publication Data
US 2007/0164571 A1   Jul. 19, 2007

(30) Foreign Application Priority Data
Jan. 13, 2006   (TW) ............... 95101474 A

(51) Int. Cl.
*F03D 9/00* (2006.01)
*H02P 9/04* (2006.01)

(52) U.S. Cl. .......................... 290/55; 290/44
(58) Field of Classification Search .................. 290/44, 290/55; 60/398; 415/4.2; 416/7, 132 B
See application file for complete search history.

(56) References Cited

U.S. PATENT DOCUMENTS

| | | | | |
|---|---|---|---|---|
| 1,345,022 A | * | 6/1920 | Oliver | 415/4.3 |
| 3,883,750 A | * | 5/1975 | Uzzell, Jr. | 290/55 |
| 4,087,196 A | * | 5/1978 | Kronmiller | 415/4.5 |
| 4,127,356 A | * | 11/1978 | Murphy | 415/4.1 |
| 4,204,799 A | * | 5/1980 | de Geus | 415/4.5 |
| 4,218,175 A | * | 8/1980 | Carpenter | 415/219.1 |
| 5,977,649 A | * | 11/1999 | Dahill | 290/55 |
| 6,043,565 A | * | 3/2000 | Les Strange | 290/55 |
| 6,955,521 B2 | * | 10/2005 | Yang | 415/4.2 |
| 7,218,011 B2 | * | 5/2007 | Hiel et al. | 290/43 |
| 7,230,348 B2 | * | 6/2007 | Poole | 290/55 |
| 2003/0137149 A1 | * | 7/2003 | Northrup et al. | 290/44 |
| 2003/0143074 A1 | * | 7/2003 | Tsukamoto et al. | 416/96 R |
| 2004/0183310 A1 | * | 9/2004 | Mowll | 290/55 |
| 2007/0102938 A1 | * | 5/2007 | Poole | 290/55 |

* cited by examiner

*Primary Examiner*—Julio C. Gonzalez
(74) *Attorney, Agent, or Firm*—Rabin & Berdo, P.C.

(57) ABSTRACT

A wind-tunnel type power generator includes an outer cover, a turbine rotor, an air escape valve, and at least a rear fin. The outer cover is a convergent-divergent shape and the turbine rotor is installed into an inner flowing path thereof, the air escape valve is installed on the outer cover and the rear fin is installed on the surface of the outer cover. The acceleration of the outer cover, the higher efficiency of the turbine rotor, and the reducing pressure of the air escape valve is to gain the wider operation area, smaller space, lower weight, lower noise, and higher efficiency of the wind-tunnel type power generator.

18 Claims, 2 Drawing Sheets

WIND-TUNNEL TYPE POWER GENERATOR

BACKGROUND OF THE INVENTION

1. Field of the Invention

The present invention relates to a wind-tunnel type power generator, and more particularly to a small-size and high-efficiency wind-tunnel type power generator.

2. Description of the Prior Art

Due to the decrement of the quantity output of the global oil and the greenhouse effect being more serious, many countries throughout the world are developing the pollution-free energy resources, such as wind power generation and solar power generation.

Reference is made to FIG. 1, which is a schematic view of a wind power generator of the prior art. A wind power generator 1 comprises a generator housing 11, a windmill 12, a rear fin 13, and a fixed stand 14. The fixed stand 14 is connected to the generator housing 11 by means of a bearing (not shown), and the generator housing 11 is connected to the windmill 12 by means of another bearing. The windmill 12 has a plurality of blades 121, and there is an acute angle between each face of the blades 121 and the axis of the windmill 12. The rear fin 13 is installed at one end of a casing 111 of the generator housing 11 far away the windmill 12. When the blades 121 are blowing by the wind, the windmill 12 rotates for driving the generator housing 11 to generate electricity. If the windmill 12 isn't facing the wind, the rear fin 13 will be blew to make the windmill 12 facing the wind so as to obtain the best electricity generation efficiency.

However, it usually enlarges the area of the blades 121 in order to increase the electricity generation energy so that a relative small wind velocity to obtain a relative large energy. For this reason, it will increase the space and weight of the wind power generator 1. While avoid damaging the wind power generator 1 due to a overload rotation velocity, it usually set a stopping wind-velocity for automatically stop running that cause it can not generate electricity at a high wind-velocity. In addition, the rear fin 13 is passively controlled by depending on the wind direction, so that an included angle between the wind direction and the face of the windmill 12 of the wind power generator 1 is zero degree, 90 degrees, or 270 degrees so as to cause worse electricity generation efficiency. Evan the rear fin 13 sometimes can not face the wind accurately without any error.

The inventor of the present invention recognizes the above shortage should be corrected and special effort has been paid to research this field. The present invention is presented with reasonable design and good effect to resolve the above problems.

SUMMARY OF THE INVENTION

An object of the present invention is to provide a wind-tunnel type power generator, which can start at a lower wind velocity and operate at a higher wind velocity so as to obtain higher electricity generation efficiency.

For achieving the objective stated above, the wind-tunnel type power generator comprises an outer cover, a turbine rotor, an air escape valve, and at least one rear fin. Wherein, the outer cover is a convergent-divergent shape and the turbine rotor is installed into an inner flowing path thereof, the air escape valve is installed on the outer cover and the rear fin is installed on the surface of the outer cover. The outer cover forms a pipe line, and the wind is guided into the pipe line and to drive the turbine rotor so as to generate electricity. Because of the convergent-divergent shape of the outer cover, that is to increase electricity generation efficiency due to the enhancement of wind velocity; and to reduce the wind resistance and avoid affecting the rotation efficiency of the turbine rotor due to the vortex. The air escape valve is opened to escape a portion wind guided so as to protective the wind-tunnel type power generator is driven under rated rotation velocity while the exceeding pressure difference between the inner pressure of the outer cover and the external pressure. In addition, the rear fin is perpendicularly installed on the surface of the outer cover for controlling the rotation direction of the wind-tunnel type power generator. Hence, by controlling the wind direction and the angle of the rear fin to keep the perpendicular surface of the wind-tunnel type power generator rotate to directly face the wind side so as to obtain the best electricity generation efficiency.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
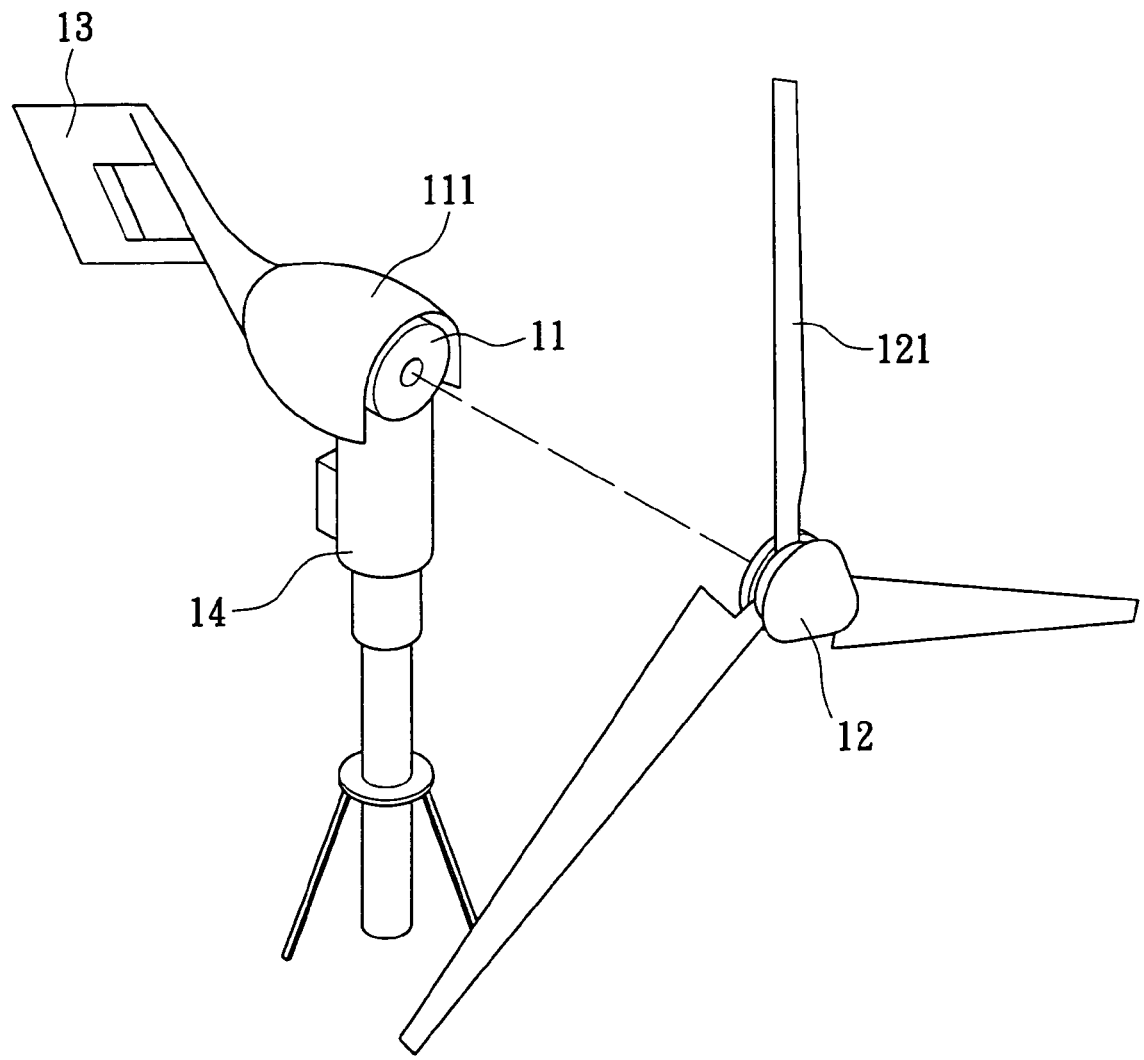
FIG. 1 is a schematic view of a wind power generator of the prior art.
Figure 2:
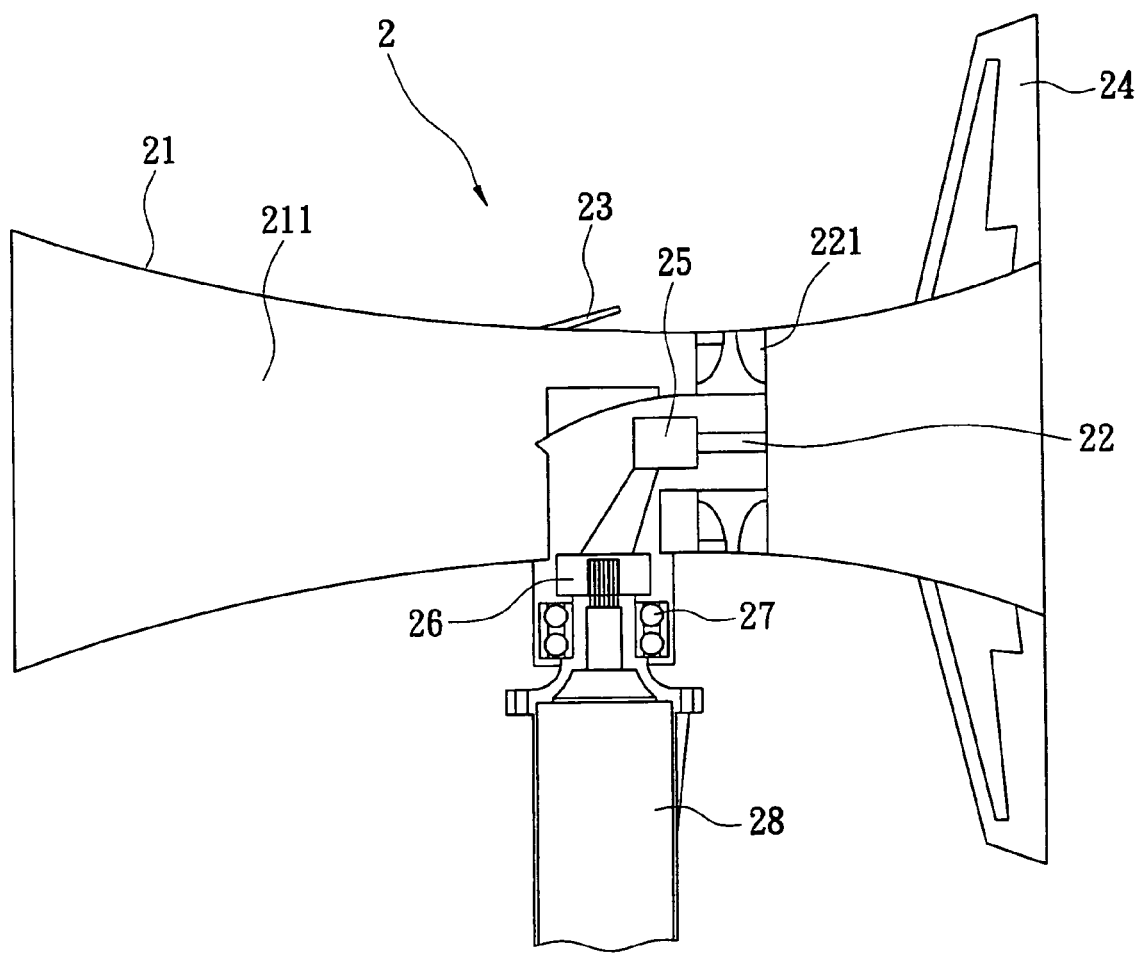
FIG. 2 is a schematic view of a wind-tunnel type power generator of the present invention.

Reference is made to FIG. 2. The wind-tunnel type power generator comprises an outer cover 21, a turbine rotor 22, an air escape valve 23, and at least a rear fin 24. The outer cover 21 is a pipe-shaped convergent-divergent shape with an air inlet and an air outlet and forms an inner flowing path 211 therein. The outer cover 21 is manufactured by metal or complex material forming, such as casting etc., as a single metal piece or is assembled by two convergent pipes in an assembly way. The outer cover 21 is convergent from an end thereof along an axis and is divergent toward the other end, which is formed with a throat at a joint portion of a convergent section and a divergent section. The turbine rotor 22 is installed in the inner flowing path 211 of the outer cover 21 and at the throat of the inner flowing path 211 of the outer cover 21. The outer cover 21 has an axis that is overlapped the axis of the turbine rotor 22. The air escape valve 23 is installed adjacent to the turbine rotor 22 and on a periphery adjacent to the air inlet of the outer cover 21. The rear fin 24 is perpendicular to the axis of the turbine rotor 22 and at an end of the outer cover 211 adjacent to the air outlet of the outer cover 21 by externally connecting, such as using screws, or integrally formed with the outer cover 21.

The wind-tunnel type power generator 2 further comprises a generator 25, an electric rotating collector 26, a bearing 27, and a fixed stand 28. The generator 25 is installed into the inner flowing path 211 of the outer cover 21 and connected with the turbine rotor 22 by means of a shaft (not shown). The electric rotating collector 26 is installed under the outer cover 21 and is electrically connected with the generator 25 by wires. The bearing 27 is installed under the electric rotating collector 26 for supporting the electric rotating collector 26 and is connected with the outer cover 21 by means of a shaft for rotating the outer cover 21. The fixed stand 28, installed under the bearing 27, is a rigid tower for supporting the wind-tunnel type power generator 2. And the rear fin 24 is installed at the rear portion of the outer cover 21 in an adjustable-angle way.

Furthermore, the turbine rotor 22 has a plurality of turbine blades 221 which are manufactured by metal or complex material forming, such as casting etc., and are circularly arranged along the axis of the turbine rotor 22 and perpendicular to the axis of the turbine rotor 22. There is an acute angle between each of the face of the turbine blades 221 and the axis of the turbine rotor 22.

While the wind is guided into the inner flowing path 211 of the outer cover 21, the wind velocity is higher due to the convergent-shape design of the outer cover 21 to drive the wind-tunnel type power generator 2 even though the external actual wind velocity is under the driving value. The turbine rotor 22 is rotated by the wind guided puffing the turbine blades 221 of the turbine rotor 22 for driving the generator 25 to generate electricity. And next, the electricity generated is collected by means of the electric rotating collector 26 for being used or transported to store. Besides, the turbine blades 221 could be formed in a fixed-angle way or in an adjustable-angle way to well use the wind so as to obtain higher electricity generation efficiency.

The air escape valve 23 is opened depending on the pressure difference between the inner pressure of the outer cover 21 and the external pressure to escape a portion wind guided so as to avoid damaging the turbine rotor 22 or the generator 25 due to an overload rotation velocity. And the air escape valve 23 is controlled to open or close by a pressure sensor or a mechanical structure, depended on the pressure such as using springs. Thus the wind-tunnel type power generator 2 has better operation region than the conventional wind power generator by using of the air escape valve 23.

In addition, the rear fin 24 is similar to an aircraft fin, and its angle is controlled by means of a controller for detecting the wind direction such as a wind direction detector. Hence, by controlling the wind direction and the angle of the rear fin 24 to keep the perpendicular surface of the wind-tunnel type power generator 2 rotate to directly face the wind side, even though an included angle between the wind direction and the air inlet of the outer cover 21 is zero degree, 90 degrees, or 270 degrees. In generally speaking, the rear fin 24 is only single perpendicularly installed on the surface of the outer cover 21 for controlling the rotation direction of the wind-tunnel type power generator 2. In order to, however, improve the stability and increase the rotation velocity of the wind-tunnel type power generator 2 while rotating, the rear fin 24 is symmetrical twin and separately perpendicularly installed on the surface of the outer cover 21.

Furthermore, the wind energy is proportional to cube of the wind velocity and is direct proportional to the function area. In other words, if increasing the wind velocity, it could obtain larger electricity generation even though decrement of the function area. Hence, by the convergent-divergent shape of the outer cover 21 to increase wind velocity so that shortening the length of the turbine blades 221 to obtain smaller function area so as to gain the same or better electricity generation efficiency. For this reason, it could reduce the space and weight of the wind-tunnel type power generator 2, and it has sound insulation effect to reduce noise, due to being covered of the turbine rotor 22 by the outer cover 21.

According to the embodiment above, the present invention can obviously increase the operation region and the electricity generation efficiency of the wind power generator, and decrease the space of the wind power generator and the noise caused by the wind power generator. Therefore, the present invention is used not only at the places for conventional wind power generators, but also at small wind fields with strong wind, which is caused by building structures such as mansions or bridges.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wind-tunnel type power generator, comprising:
    an outer cover, being pipe-shaped and forming an inner flowing path;
    a turbine rotor, installed in the inner fluid path of the outer cover;
    an air escape valve, installed on a periphery of the outer cover;
    at least one rear fin, installed on a surface of the outer cover;
    a generator, installed into the inner flowing path of the outer cover and connected with the turbine rotor;
    an electric rotating collector, installed under the outer cover and connected with the generator;
    a bearing, installed under the electric rotating collector; and
    a fixed stand, installed under the bearing.

2. The wind-tunnel type power generator as in claim 1, wherein the outer cover is a convergent from an end thereof along an axis and is divergent toward the other end.

3. The wind-tunnel type power generator as in claim 1, wherein the outer cover has an axis overlapped that of the turbine rotor.

4. The wind-tunnel type power generator as in claim 1, wherein the outer cover is formed in one piece or in a assembly way.

5. The wind-tunnel type power generator as in claim 4, wherein the outer cover is manufactured by casting.

6. The wind-tunnel type power generator as in claim 1, wherein the turbine rotor is installed at the throat of the convergent-divergent joint of an inner flowing path of the outer cover.

7. The wind-tunnel type power generator as in claim 1, wherein the turbine rotor has a plurality of turbine blades, the turbine blades are mounted in a fixed-angle way or adjustable-angle way.

8. The wind-tunnel type power generator as in claim 7, wherein the turbine blades are manufactured by casting.

9. The wind-tunnel type power generator as in claim 7, wherein the turbine blades are circularly arranged along an axis of the turbine rotor and perpendicular to the axis of the turbine rotor.

10. The wind-tunnel type power generator as in claim 1, wherein the air escape valve is installed adjacent to the turbine rotor and on a periphery adjacent to an air inlet of the outer cover.

11. The wind-tunnel type power generator as in claim 1, wherein the air escape valve is controlled to open or close by a pressure sensor or a mechanical structure depended on an air pressure.

12. The wind-tunnel type power generator as in claim 1, wherein the rear fin is installed at an end of the outer cover adjacent to an air outlet of the outer cover.

13. The wind-tunnel type power generator as in claim 1, wherein the rear fin is integrally formed with the outer cover.

14. The wind-tunnel type power generator as in claim 1, wherein the rear fin is installed on a surface of the outer cover by externally connecting.

15. The wind-tunnel type power generator as in claim 1, wherein the rear fin is single and is perpendicularly installed on the surface of the outer cover.

16. The wind-tunnel type power generator as in claim 1, wherein the rear fin is symmetrical twin and separately perpendicularly installed on the surface of the outer cover.

17. The wind-tunnel type power generator as in claim 1, wherein the rear fin is used to control direction by means of a controller.

18. The wind-tunnel type power generator as in claim 1, wherein the fixed stand is a rigid tower.

* * * * *